United States Patent [19]
Hember

[11] Patent Number: 5,633,934
[45] Date of Patent: May 27, 1997

[54] LOCAL AREA NEWORK ENCRYPTION DECRYPTION SYSTEM

[76] Inventor: John T. Hember, 412 Pickford Drive, Kanata, Ontario, Canada

[21] Appl. No.: 670,438

[22] Filed: Jun. 26, 1996

Related U.S. Application Data

[63] Continuation of Ser. No. 164,961, Dec. 9, 1993, abandoned.

[51] Int. Cl.$^6$ .................................................. H04L 9/00
[52] U.S. Cl. ............................................................ 380/50
[58] Field of Search .................................. 380/3, 4, 25, 50

[56] References Cited

U.S. PATENT DOCUMENTS

| | | | |
|---|---|---|---|
| 4,937,861 | 6/1990 | Cummins | 380/50 |
| 5,007,082 | 4/1991 | Cummins | 380/25 |
| 5,249,232 | 9/1993 | Erbes et al. | 380/50 |
| 5,444,850 | 8/1995 | Chang | 380/3 |

*Primary Examiner*—Salvatore Cangialosi
*Attorney, Agent, or Firm*—Pascal & Associates

[57] ABSTRACT

The present invention relates to a data encryption and/or decryption system comprised of apparatus for storing encryption and/or decryption keys, an encryption and or decryption processor for receiving data signals, for receiving the key or keys from the storing apparatus, and for encrypting or decrypting the data signals in accordance with the key or keys, an output data bus for receiving the encrypted or decrypted signals from the processor, apparatus for plugging the system into a read-only memory (ROM) socket of a computer for access to a source of the data signals and to the output data bus, whereby the data signals are received, and encrypted data signals are passed through the ROM socket.

9 Claims, 2 Drawing Sheets

LOCAL AREA NEWORK ENCRYPTION DECRYPTION SYSTEM

This is a continuation of application Ser. No. 08/164,961 filed Dec. 9, 1993 now abandoned.

FIELD OF THE INVENTION

The invention relates to a system for encrypting and decrypting data traffic to be passed along a Local Area Network (LAN) using a standard Personal Computer (PC) LAN adapter.

BACKGROUND TO THE INVENTION

Local Area Networks are used to connect computers in such a way that they can communicate with each other at very high speeds, e.g. of the order of 10 Mbps. In larger user organizations these computers are connected to backbone networks so that different department LANs can communicate and finally the backbone network may have a bridge to a Wide Area Network (WAN) in order to communicate to the outside world. As computers become more powerful LAN's and WANs allow organizations to distribute the power and still maintain connectivity.

Many user organizations have a need to keep certain types of data secure. This may range from a small company which has a responsibility to protect its employee's confidential data, to companies working on defense related contracts, to the government security and diplomatic services. More and more of this data is being placed on computers.

Data encryption devices secure sensitive information while it is electronically transmitted, stored, or otherwise processed. Encryption systems which include both hardware devices and software programs employ a mathematical algorithm to scramble plain text, rendering it unintelligible until it is unscrambled through the use of a special digital key. The security of the system is a direct function of the possession of the key.

Many hardware-based encryptors are simple microprocessor-based systems that electronically encode data at the sending end and decode data at a receiving end. Several effective software programs run as applications programs on a user's computer system.

Hardware encryption devices provide certain advantages over application software. For example, the installation of encryption hardware has a minimal effect on the user's existing computer system. Also, an encryption process employing hardware is virtually immune to unauthorized, undetected alteration. Software, on the other hand, is susceptible to programmer modification.

There are two categories of means for providing data security on LANs connected to personal computers: the first category is comprised of software-only programs which are inexpensive but which have been found to be somewhat ineffective, and the second category of hardware/software combinations that offer adequate security but are expensive due to the addition of a circuit board.

SUMMARY OF THE INVENTION

To connect to a LAN, a computer such as a personal computer has a LAN adapter subsystem connected to (plugged into) its main address and data buses which are accessible by the main processor of the computer. In order to provide means for a computer without disk drive storage to boot up (be controlled by a bootstrap program in order to retrieve its operating system from the LAN and become operational), LAN adapters are typically provided with a read-only memory (ROM) socket into which the bootstrap ROM may be plugged. The ROM socket is typically connected to a LAN adapter, and has its pin signals accessible to the main system processor. Communication paths to the ROM socket are typically non-standard, and are arranged with only reading a ROM in mind. Consequently, interface circuits to the ROM, and the conductive paths to the ROM have been made specialized for reading, and not writing data.

It has been found that the bootstrap ROM socket on the LAN is virtually never used, personal computer users preferring to bootstrap their computers using bootstrap ROMS in their own computers to retrieve the operating system from resident disk drives. The present invention utilizes the empty ROM socket on LAN adapters (such as those connectable to IBM PC compatible computers) and can provide line rate, standard data encryption and secure, non-volatile key storage. A hybrid module embodying the present invention is a pin-for-pin multi-chip hybrid module replacement for a conventional ROM. Yet the present invention provides for both writing and reading, in order to encrypt data, store keys, and read the keys, and thus allowing the hybrid module to offer the advantages of the hardware solution at the price of the software-only solution.

The present invention security module referred to herein as LanDES (local area network data encryption security) can provide line rate standard data encryption to all personal computer LANs without degradation of performance and in a manner which is completely transparent to the user. The user need not buy an expensive board to retrofit a computer. The module in volume could be produced at such a low cost that it could be shipped with LAN adapters as a low cost option. The user can protect its LAN traffic for tens of dollars instead of hundreds of dollars per client.

As noted above, the LanDES module plugs into the empty ROM socket on typically an IBM PC, PS/2 compatible LAN adapters and provides line rate, standard data encryption and secure, non-volatile key storage. The LanDES module is a pin-for-pin multi-chip hybrid module replacement for a conventional ROM. Unlike a conventional ROM, the LanDES module allows data to be written to the device. A commercial LanDES module may provide encryption at a sustained 32 Mbit/sec throughput, and it may provide from 128 bytes to 8 Kbytes of secure, non-volatile storage depending on the memory device selection.

In order to present easy access to key information and further enhance the security of the system, the keys may be super encrypted with an unique master key. This master key is stored in serial EEROM in each LanDES module.

In order to be fully compatible with the major LAN operating systems and transparent to the network, a main computer device driver of conventional form accesses the present invention, as will be described in more detail below. The device driver will embody typical data security applications and may include key management, line encryption, audit trailing, message and user authentication, access control, user groups and password aging.

In accordance with an embodiment of the present invention, a data encryption and/or decryption system is comprised of apparatus for storing encryption and decryption keys, an encryption and/or decryption processor for receiving data signals, for receiving the key or keys from the storing means, and for encrypting or decrypting the data signals in accordance with the key or keys, an output data bus for receiving the encrypted or decrypted signals from the data encryption processor, apparatus for plugging the system into a read-only memory (ROM) socket of a computer for access to a source of the data signals and to the output data bus, whereby the data signals are received, and encrypted data signals are passed through the ROM socket.

In accordance with another embodiment, the source of data signals is a ROM socket address bus accessible by the computer microprocessor and the encrypted data signals are applied to the data bus, the output data bus being accessible to a computer microprocessor.

In accordance with another embodiment, the system includes a local area network (LAN) adapter system for connection to the computer which contains the ROM socket, the ROM socket being a socket, designated for a boot ROM for the computer, in the LAN adapter system for booting the computer from the boot ROM of the LAN adapter.

In accordance with another embodiment, the system includes an electrically erasable read only memory (EEROM) for storing a master key, and apparatus for securely loading or modifying the master key in EEROM and for reading the master key from EEROM into the encryption engine.

BRIEF INTRODUCTION TO THE DRAWINGS

A better understanding of the invention will be obtained by reading the description of the invention below, with reference to the following drawings, in which.

DETAILED DESCRIPTION OF THE INVENTION

Figure 1:
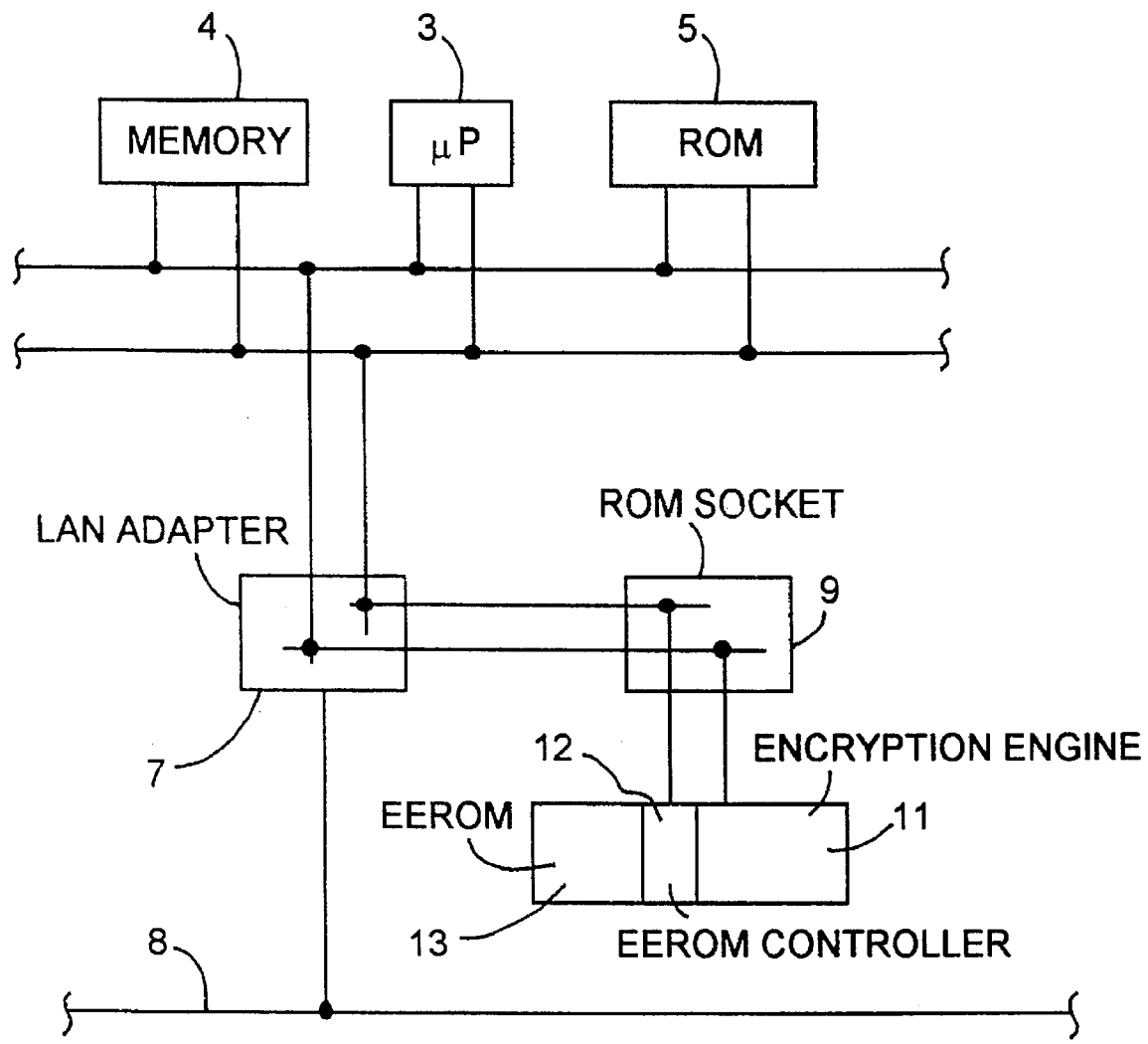
FIG. 1 is a general block diagram of the invention.

FIG. 1 illustrates a portion of personal computer, comprised of a data bus 1, an address bus 2, a microprocessor 3 which is connected to the buses, a random access memory (RAM) 4, connected to the buses, and a bootstrap ROM 5 also connected to the buses, both memories being accessible to the microprocessor via the buses. The remaining parts of the computer are not shown, in order not to clutter the drawing with elements that are not essential to an explanation of the present invention.

In order to connect the computer to a LAN, a LAN adapter 7, typically formed of a circuit on a printed circuit board, is connected (plugged into) the buses, for access by the computer microprocessor, and is also connectable to a LAN 8. The LAN adapter has a ROM socket 9 mounted on it, into which another bootstrap ROM is expected to be plugged in. As noted above, this is virtually never used, for the reason that the computer can be booted up by using a bootstrap program stored in ROM 5. Thus while the buses 1 and 2 are accessible by the LAN adapter, extensions of those buses to ROM socket 9 are typically passed through an internal non-standard interface which has the expectation only of being able to read from, and not write to, a ROM plugged into ROM socket 9.

In accordance with the present invention, a data security device 10 (LanDES) which is a pin-for-pin hybrid replacement for a conventional ROM device is plugged into ROM socket 9. However unlike a conventional ROM the LanDES allows for the device to be written to. The device 10 has an integrated data encryption engine 11 and a secure EEROM read/write access controller 12. The data encryption engine 11 and the EEROM controller 12 are independent and may be used independently, an EEROM 13 optionally may accompany the controller on the LanDES hybrid. Since the EEROM may be used independently, it can contain a bootstrap program which can be used to allow the computer to boot up from the LAN.

The data encryption engine can support the Cipher-Block-Chaining (CBC) and other modes of encryption such as EBC and CFB modes of data encryption.

The EEROM controller 12 allows reading of the EEROM during normal operation. When a protection window is open and a password has been matched or when password protection is disabled, the EEROM 12 controller allows the modification of the EEROM's contents, read-protection of selectable portions of the EEROM and modification of the password. The EEROM may be used for computer bootcode and/or secure key storage.

In operation, the invention can be used in any of three modes.

In the first mode, data is passed under control of microprocessor 3 to the LAN adapter, which applies the data to the data security device 10 via ROM socket 9, which applies the EEROM data to data bus 1, also via ROM socket 9.

In second mode, the data to be applied to the LAN is prefixed with a predetermined sequence. The encryption controller, having stored an encryption code in a manner as will be described below, detects the sequence on the address bus 2, and instead of passing the data out to the data bus, applies the stored encryption keys to the data using an encryption algorithm, resulting in encryption of the data. The encrypted data is output on the data bus 1 for application to the LAN 8 by the LAN adapter 7.

In a third mode, the data to be applied to the LAN is prefixed with a different predetermined sequence. The encryption controller 11, detecting this different predetermined sequence, enables storage of subsequent data in the EEROM. The subsequent data can be for example a master key which is used for encryption of data received on the address bus. That key can then be used to encrypt subsequent data received on the address bus that is prefixed with another predetermined sequence.

The third mode of operation is the most secure, since the key or keys stored in the EEROM can only be changed by persons who know the aforenoted different predetermined sequence. The second mode of operation may be less secure, since the predetermined sequence used may be obtained from the driving program used by the microprocessor 3, and thus can be changed at will by the user.

Either of the second and third modes may be used to encrypt data automatically for all data that arrives on the address bus, only if that data that is prefixed by a special prefix that places the encryption controller into an encryption mode.

Figure 2:
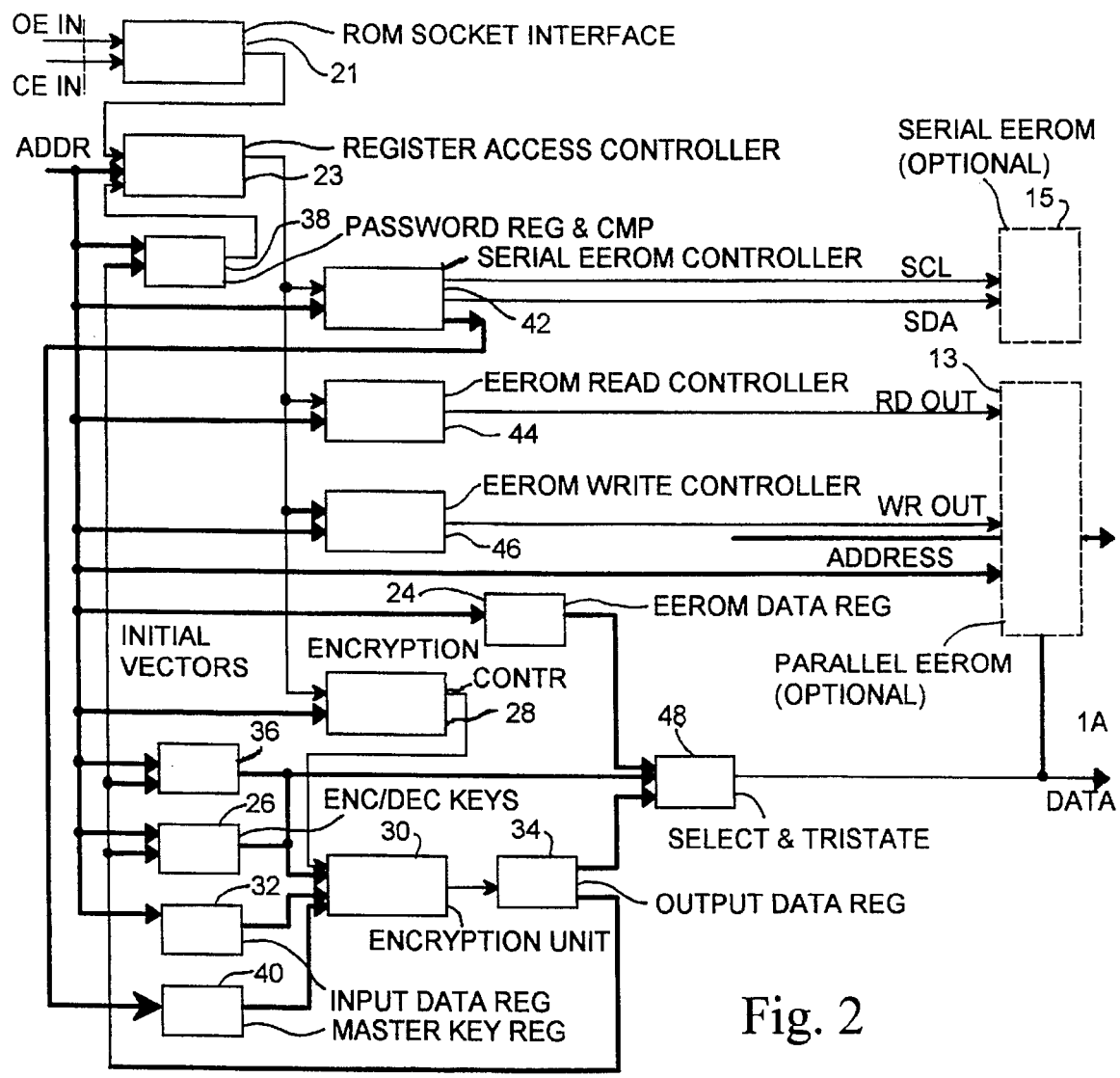
FIG. 2 is a more detailed block diagram of the invention.

FIG. 2 is more detailed block diagram of the invention.

A ROM interface circuit 21 samples the read enable (CE) and output enable (OE) strobe signals generated by processor 3 and carried of buses 1 and 2, to determine if a single valid ROM read access command has occurred. The ROM interface interprets multiple and false strobe edges and strobe to address/data setup and hold violations to produce a single access strobe of fixed duration, which is applied to register access controller 23. Address bus 2A, which is derived from address bus 2, is connected via ROM socket 9 to register address controller 23. Register access controller 23 may be a microprocessor.

Register access controller 23 preferably has two distinct modes of operation, which may be termed as window-closed mode and window-open mode. The "window" is a write protection mechanism which, when open, enables access to data encryption and EEROM controllers; and when closed allows normal read accesses of the contents of an accompanying EEROM 13.

Operations pertaining to password protection, EEROM modification and EEROM read protection are further protected by a password matching mechanism. The window protection mechanism protects against inadvertent operations whereas the password protects against malicious operations.

Data register 24 also has an input connected to address bus 2A, and an output connected to the data input of EEROM 13.

While the window is closed, EEROM reads are passed directly to the accompanying EEROM via the EEROM read controller 42. The EEROM 13 data is output directly on data bus 1A, unencrypted.

During this mode the data arriving on the address bus can address an encryption/decryption key register 26. The immediately following data can then be an encryption key, which is stored in register 26. The register access controller 23, recognizing the address, enables encryption controller 28, which enables encryption unit 30. Subsequent data received on address bus 2A passes into an input data register 32, which passes the data into encryption unit 30. Encryption unit 30, receiving the data from data register 30 and encryption keys from register 26, encrypts the received data in accordance with the keys and outputs the encrypted data into an output data register 34 from where it is output to EEROM 1A, and then to data bus 1A.

Initialization vector registers 36 are provided for use in the encryption process. The output of output data register 34 is also connected to an initial vectors register 36, to allow the loading of encrypted initialization vectors The input of the initial vectors register is connected to the address bus 2A in order to obtain initial vectors data from processor 3, as provided by the driving program processed by processor 3.

It should be recognized that in another embodiment, the data registers 24 and 34 can be connected also to bus 1A, in order to apply their output data signals directly to that bus without being passed first into EEROM 13. In that case register access controller 23 should provide an inhibiting signal to data register 24 when data is to be encrypted via encryption unit 30, in order to avoid collisions between encrypted and unencrypted data being simultaneously applied to the output bus 1A.

Because the keys stored in register 26 are received from the address bus 2A, they are clearly less secure than a key, such as a master key, that may only be changed after password security checks are made. Another embodiment of the invention provides this highly secure mode of operation, as will be described below.

During this mode of operation the register access controller 23 monitors all ROM socket read access commands for a specific sequence of 32 read bits which will open the window. The sequence can be thought of as a 32-bit word written to the controller serially using the CEin and OEin inputs as a data strobe for latching the state of a specific address line (which acts as a data input) while the combination of the other address lines qualify the operation. If the wrong sequence is received, or if the controller is accessed at addresses other than those which strobe the data then the window opening sequence is aborted and must be restarted.

Opening of the register access controller's 23 window allows access to the controller's various control, status and data registers for controlling of the modification of stored data in the EEROM and of keys used by the data encryption unit.

The encryption engine's 13 and the EEROM controller's 12 internal registers are preferably written and read eight bits at a time, while the window is open, using only read operations to specific controller addresses. In a successful model of the invention, register write operations used the lower eight address lines (A9-2) as data inputs (refer to table 3). Data was read via the data lines. Since the address lines are used for writing of data and the data lines are used for the reading of data, the controller's registers may be written and read simultaneously thus allowing the pipelining of encryption data, and high speed operation of the invention.

In a successful model of the invention and in accordance with a preferred embodiment of the invention, address line A10 qualified the cycle as being a read or write access (1 or 0 respectively). Address line A11 indicated whether a pointer register or the current register is accessed (1 or 0 respectively). Address line A12 qualified the operation if set to zero, otherwise the operation was not performed and the window closed.

Registers are preferably read or written in a two access fashion. A pointer register is first written (A11 high) to indicate which register will be subsequently accessed via the current register address (A11 low). The current register may be accessed multiple times between changing of the Pointer Register.

Registers pertaining to password protection, EEROM modification and read protection are protected against modification by a password access control mechanism as described below. A password register and comparator 38 has its output connected to an input of register access controller 23, and inputs connected to address bus 2A and to the output of a master key register 40. Master key register 40 has its input connected to the output of a serial EEROM controller 42, which has an input connected to the address bus 2A, an input connected to controller 23, an output connected to the SCL input of EEROM 13, and a bidirectional link connected to the SDA port of EEROM 13.

A password protection mechanism prevents modification of EEROM data, EEROM read protection and password data. On power-up, password protection is disabled and the password registers are not initialized. In a typical personal computer environment, the EEROM code resident in the LanDES is executed before user programs, thus allowing the EEROM code to load the password out of the EEROM and enable subsequent password protection.

The password register and comparator 38 compares a user entered password to a stored password.

The serial EEROM read/write controller 42 controls the accessing of the serial EEROM 13. It provides limited access to particular regions of the EEROM thus allowing for secure master key storage. It controls the secure transfer of master key data from the EEROM to the master key register 40. It only allows the stored master key to be modified if a valve based on the master key, encrypted using the master key, has been loaded into the password register 38 and matched. The master key is never accessible by the computer nor need it be stored on the computer.

A parallel EEROM read controller 44 has an input connected to address bus 2A, and an enable input connected to an enable output of controller 23, and an output connected to a RDout input of EEROM 13. Controller 44 passes read access control data signals through from address bus 2A to EEROM 13 during normal access requests.

If read protection is enabled, then this controller 44 prevents the reading of user selectable EEROM address contents during normal EEROM accesses. This allows protection of key and password data regions within the EEROM.

A parallel EEROM write controller 46 has its input connected to address bus 2A, an enable input connected to an enable output of controller 23, and an output connected to the WRout input of EEROM 13. The controller 46 allows for the modification of the EEROM's contents once the access protection window is open and the password has been matched or disabled. The EEROM's contents are written by loading the new desired EEROM data value from address bus 2A into the EEROM data register 24, and issuing a EEROM write command from the driver program stored in memory 4, by means of processor 3, to the write controller's command register. A subsequent read from the EEROM 13 address that is to be changed will cause the controller 46 to output the new data value to the EEROM while asserting the EEROM's write strobe to input WRout.

The EEROM data register 24 is a temporary register for new EEROM data values, for this mode of operation. It facilitates the modification of the EEROM's contents as described above.

The data encryption/decryption controller 28 controls the flow of data through the encryption unit 30. It enables the mode of encryption based on user selection via the driver program and provides status of the encryption unit back to the user.

The data encryption/decryption unit 30 may be any form of data encryption engine. The initialization vector registers 36 provide for feedback forms of encryption. The encryption/decryption key registers 26 and 40 store keys for use by the encryption unit for encryption and decryption of data.

The input register 32 to the encryption unit allows temporary storage of data to be encrypted or decrypted and thus providing for the pipelining of encryption/decryption. The output register 34 from the encryption unit allowing temporary storage of data that has been encrypted or decrypted and thus providing for the pipelining of encryption/decryption. The master key register 40 is loaded securely from the serial EEROM 13 under the control of the serial EEROM controller 42. The master key provides for the secure loading of master key encrypted encryption and decryption keys and initialization vectors.

In a successful model of the invention, the Data Encryption Standard (DES) algorithm was used for encryption/decryption of data, but any encryption algorithm may be used. Also, in a successful model of the invention, an EEROM memory device was used for key and/or program storage, but any non-volatile storage device may be used (for example, FLASH memory devices or battery backed SRAM).

It will be understood that the function of encrypting and the function of decrypting are reciprocal. Therefore the description above which is directed to an embodiment for encrypting is intended to be equally directed to decrypting.

A person understanding this invention may now conceive of alternative structures and embodiments or variations of the above. All of those which fall within the scope of the claims appended hereto are considered to be part of the present invention.

I claim:

1. A data encryption and/or decryption system comprising:

(a) means for storing encryption and/or decryption keys, (b) an encryption and/or decryption processor for receiving data signals, for receiving said key or keys from the storing means, and for encrypting or decrypting the data signals in accordance with said key or keys, (c) an output data bus for receiving the encrypted or decrypted signals from said processor, (d) means for plugging said system into a read-only memory (ROM) socket of a computer for access to a source of said data signals and to said output data bus, (e) said source of data signals being a ROM socket address bus accessible by a computer micro-processor, and said encrypted data signals being applied to said data bus, said output data bus being accessible to the computer microprocessor, (f) a local area network (LAN) adapter system for connection to the computer containing said ROM socket, said ROM socket being a socket, designated for a boot ROM for the computer, in said LAN adapter system for booting the computer from the boot ROM of said LAN adapter, whereby said data signals are received, and encrypted data signals are passed through said ROM socket.

2. A system as defined in claim 1 including an electrically erasable read only memory (EEROM) for storing a master key, and means for securely loading or modifying the master key in the EEROM and for reading the master key from the EEROM into the storing means.

3. A system as defined in claim 2 including means for detecting a first predetermined data sequence on said address bus and for enabling storage of a master key or of a replacement master key in the EEROM in case of detection of said first data sequence.

4. A system as defined in claim 3 including means for detecting a second predetermined sequence on said address bus and for enabling encryption of received data signals appearing on the address bus in case of detection of said second data sequence.

5. A system as defined in claim 1 including means for receiving an encryption key from the address bus and for encrypting received data signals subsequently appearing on the address bus in accordance with the encryption key.

6. A system as defined in claim 5 including means for detecting a particular predetermined sequence on said address bus and for enabling encryption of said received data signals only after said particular predetermined sequence has been detected.

7. A system as defined in claim 5 including an electrically erasable read only memory (EEROM) for storing a master key, and means for reading said EEROM for transmission of the master key to said storing means.

8. A system as defined in claim 7 including means for detecting a first predetermined data sequence on said address bus and for enabling storage of a master key or of a replacement master key in the EEROM in case of detection of said first data sequence.

9. A system as defined in claim 8 including means for detecting a second predetermined sequence on said address bus and for enabling encryption of received data signals appearing on the address bus in case of detection of said second data sequence.

* * * * *